US011119581B2

(12) United States Patent
Pahud et al.

(10) Patent No.: US 11,119,581 B2
(45) Date of Patent: Sep. 14, 2021

(54) DISPLACEMENT ORIENTED INTERACTION IN COMPUTER-MEDIATED REALITY (71) Applicant: MICROSOFT TECHNOLOGY LICENSING, LLC, Redmond, WA (US)

(72) Inventors: Michel Pahud, Kirkland, WA (US); Nathalie Riche, Issaquah, WA (US); Eyal Ofek, Redmond, WA (US); Christophe Hurter, Toulouse (FR)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/812,061

(22) Filed: Mar. 6, 2020

(65) Prior Publication Data
US 2020/0209978 A1    Jul. 2, 2020

Related U.S. Application Data (63) Continuation of application No. 15/624,463, filed on Jun. 15, 2017, now Pat. No. 10,620,710.

(51) Int. Cl.
*G06F 3/01* (2006.01)
*G06F 3/0346* (2013.01)
*G06F 3/0482* (2013.01)
*G06F 3/0481* (2013.01)

(52) U.S. Cl.
CPC .............. *G06F 3/017* (2013.01); *G06F 3/011* (2013.01); *G06F 3/012* (2013.01); *G06F 3/0346* (2013.01); *G06F 3/0482* (2013.01); *G06F 3/04815* (2013.01)

(58) Field of Classification Search
CPC ........ G06F 3/017; G06F 3/011; G06F 3/0482; G06F 3/012; G06F 3/0346; G06F 3/04815
See application file for complete search history.

(56) References Cited

U.S. PATENT DOCUMENTS

| 9,047,698 | B2* | 6/2015 | Maciocci | G06F 3/167 |
| 10,423,241 | B1* | 9/2019 | Pham | G02B 27/0093 |
| 2010/0103093 | A1* | 4/2010 | Izumi | G06F 3/0334 345/156 |

(Continued)

FOREIGN PATENT DOCUMENTS

KR    101369358 B1 *  3/2014

OTHER PUBLICATIONS

"Office Action Issued in European Patent Application No. 18770130. 5", dated Apr. 26, 2021, 7 Pages.

*Primary Examiner* — Liliana Cerullo
(74) *Attorney, Agent, or Firm* — Shook, Hardy & Bacon L.L.P.

(57) ABSTRACT

In various embodiments, computerized systems and methods for displacement oriented interaction with objects in a computer-mediated environment are provided. In one embodiment, the system detects a wearable device moved with a displacement transversal to a longitudinal axis of the wearable device. If the system determines that the displacement is within a displacement range associated with an actionable item, the system may select the actionable item or activate an operation associated with the actionable item, such as modifying an object in the computer-mediated reality environment.

20 Claims, 8 Drawing Sheets

(56) References Cited

U.S. PATENT DOCUMENTS

| | | | |
|---|---|---|---|
| 2011/0199393 A1* | 8/2011 | Nurse | G06F 3/0482 345/665 |
| 2012/0005624 A1* | 1/2012 | Vesely | G06F 3/04842 715/808 |
| 2012/0016624 A1* | 1/2012 | Caritu | G06K 9/00348 702/141 |
| 2012/0086729 A1* | 4/2012 | Baseley | G06T 19/006 345/633 |
| 2012/0327116 A1 | 12/2012 | Liu et al. | |
| 2015/0338915 A1* | 11/2015 | Publicover | G06F 3/0304 345/633 |
| 2015/0355805 A1* | 12/2015 | Chandler | G06F 3/04842 715/784 |
| 2016/0098090 A1* | 4/2016 | Klein | G06F 3/0482 345/156 |
| 2016/0366266 A1* | 12/2016 | Chung | H04W 76/14 |
| 2017/0300132 A1* | 10/2017 | Hiroi | G06F 3/0338 |
| 2017/0336870 A1* | 11/2017 | Everett | G06F 3/017 |

* cited by examiner

DISPLACEMENT ORIENTED INTERACTION IN COMPUTER-MEDIATED REALITY

CROSS-REFERENCE TO RELATED APPLICATIONS

This application is a continuation of and claims priority from U.S. application Ser. No. 15/624,463, filed Jun. 15, 2017, entitled "Displacement Oriented Interaction In Computer-Mediated Reality," which is assigned or under obligation of assignment to the same entity as this application, the entire contents of each application being herein incorporated by reference.

BACKGROUND

Computer-mediated reality (CMR) refers to one's perception of reality being mediated through the use of a computing device, e.g., a wearable computer or handheld device. Typically, the computing device mediates the user's visual perception of the environment. Various CMR technologies, such as virtual reality (VR), augmented reality (AR), and mixed reality (MR), enable users to view and perceive computer-generated two-dimensional (2D) objects and three-dimensional (3D) objects, as if the objects were actually present within the user's perceived environment. Advancements in computing have fueled tremendous development efforts to apply these technologies to both entertainment and enterprise marketplaces.

Conventional interaction techniques in CMR are often cumbersome, and such interactions usually are limited to eye gaze or hand operations, e.g., on a controller. Consequentially, conventional interaction in CMR may just be another sedentary task or potentially another contributing factor to risks of metabolic syndrome, heart attack, stroke risk, and overall health issues, especially for people working long hours without sufficient physical activities.

SUMMARY

Embodiments described herein provide methods and systems for displacement oriented interaction (DOI) in CMR environments. More specifically, the DOI technology disclosed herein can detect a pattern of displacement of a wearable device or a user. Subsequently, the DOI technology may activate a relevant operation in the CMR environment based on the pattern of displacement.

In various embodiments, signals indicating a pattern of displacement of a wearable device or a user are received by a computing device configured to mediate the CMR environment. The computing device is integrated with the wearable device in some embodiments. The computing device determines whether the pattern of displacement is consistent with a predefined pattern of displacement of an operation related to an object or a view in the CMR environment. Further, the computing device can activate the operation in the CMR environment in response to the detected pattern of displacement being consistent with the predefined pattern of displacement of the operation. Optionally, the computing device may augment the CMR environment with a presentation of relevant operations based on the context of the object or the view in the CMR environment, e.g., to guide the user to selectively activate a specific operation. To this end, disclosed methods and systems for DOI enable not only intuitive and guided interactions with objects in CMR environments, but also enable users in the CMR environments to be physically active during such interactions.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

In accordance with embodiments described herein, the CMR environment can include any one of a virtual reality (VR) environment, an augmented reality (AR) environment, and a mixed reality (MR) environment, each of which are at least partially rendered by one or more computing devices and provided for immersive display to a user. The term "environment" can reference a portion of or an entire collection of rendered objects available for perceivable display to the user. For instance, in a fully virtual environment (e.g., VR), the environment can reference one or more sets of rendered objects, a rendered background or particle system, or any portion and/or combination thereof. In a partially virtual environment (e.g., AR or MR), the environment can reference one or more sets of rendered objects, a particle system, a real-world space or backdrop, or any portion and/or combination thereof.

In dynamic and constantly changing CMR environments, it is important to provide users with intuitive modes of interaction with precision in controllability. Conventional interactions, such as using keyboards and mice, have become prevalent in conventional computing environments. However, such conventional interaction means are disadvantageous and often impractical for a user to achieve an immersed experience in a CMR environment.

Embodiments of the present disclosure provide systems and methods for DOI in a CMR environment. With the DOI technology, a user can interact naturally with a target object in the CMR environment using kinetic movement. In some embodiments, a wearable device, such as a head-mounted display (HMD) device, can detect the kinetic movement and recognize the pattern of displacement of the wearable device. If the pattern of displacement is consistent with a predefined pattern of displacement of an operation related to an object or a view in the CMR environment, the wearable device may further activate the operation in the CMR environment. Optionally, the computing device may augment the CMR environment with a presentation of relevant operations based on the context of the object or the view in the CMR environment, e.g., to guide the user to selectively activate a specific operation.

By way of example, the wearable device detects the eye gaze of a user at a 3D object. Accordingly, the wearable device may cause a radial menu with multiple sections presented within the field of view of the user in the CMR environment. Each section of the radial menu represents a mode or an operation related to the 3D object. Further, the wearable device may cause a replica of the radial menu (e.g., a light-based replica) displayed on the floor around the user.

While guided by the radial menu in front of the user and remaining at the head-up posture, the user may walk to a specific section of the radial menu to select a specific mode or operation related to the target object. In this regard, the wearable device may detect its own displacement caused by the kinetic movement of the user, and determine the specific section of the radial menu selected by the user accordingly. If the wearable device confirms the user's section of the specific mode or operation, the wearable device may further activate the mode or operation, such as to modify the target 3D object in the CMR environment.

Advantageous, disclosed methods and systems for DOI in CMR enable not only intuitive and guided interactions with objects in CMR environments, but also enable users in the CMR environments to be physically active during such interactions. Further, the DOI technology may also free up user's hands, so that users may use hand operations (e.g., hand gestures) in combination of foot movement to engage more sophisticated interactions in CMR environments.

Figure 1:
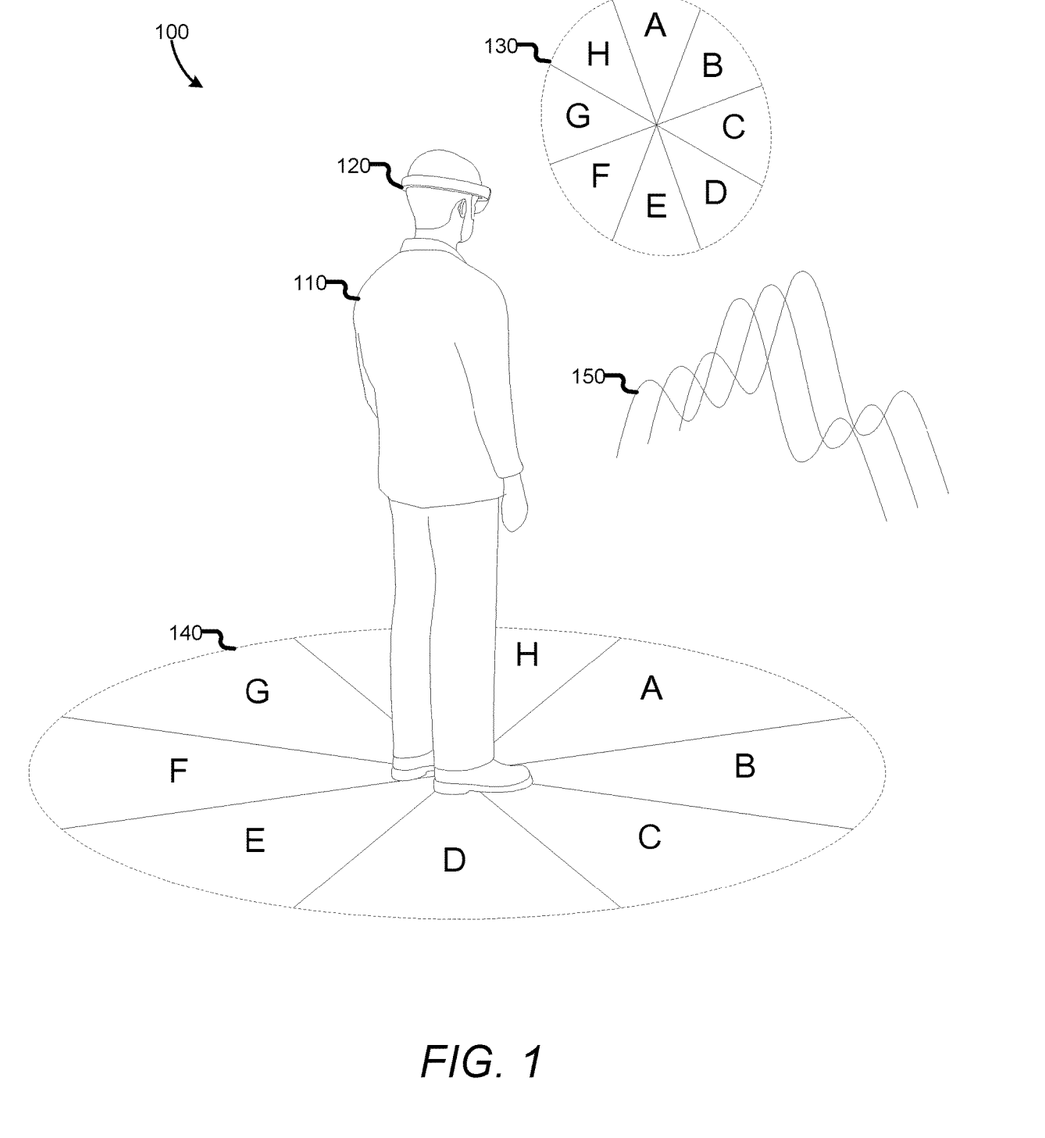
FIG. 1 is a schematic showing an exemplary environment enabled for DOI in CMR, in accordance with some embodiments of the present disclosure.

With reference now to FIG. 1, an exemplary environment enabled for DOI with objects in a CMR environment is provided, in accordance with some embodiments of the present disclosure. In this CMR environment, head-mounted display (HMD) 120 enables user 110 to view virtual object 150. HMD 120 can detect the gaze of user 110, and select virtual object 150 based on the gaze of the user 110.

User 110 may want to interact with virtual object 150, e.g., for the purpose of modifying virtual object 150. In this case, user 110 may make a preconfigured kinetic gesture, such as a jumping gesture, a squatting gesture, or a hand gesture, to activate a menu of available operations associated with virtual object 150. The kinetic gesture can be detected by HMD 120 and/or a computing device (e.g., stationary sensors in the room, another wearable device, etc.) connected or in communication with HMD 120.

Subsequently, HMD 120 may cause radial menu 130 with different sections presented within the field of view of the user in the CMR environment. Each section of the radial menu represents an operation associated with virtual object 150. The content of radial menu 130 is context-dependent, such that operations relevant to the present view and/or the present object are presented on radial menu 130. For example, operations related to virtual object 150 may include changing colors, changing orientation, changing size (e.g., zoom in or zoom out), changing shape, moving, rotating, adding data, removing data, etc.

Further, HMD 120 may replicate radial menu 130 as replica menu 140, and cause replica menu 140 displayed on the floor around the user. Replica menu 140 may be displayed on a large display placed horizontally on the floor, as an actual image projected from a light emitter, or a virtual image rendered by HMD 120. Radial menu 130 or replica menu 140 can server as an intuitive visual guide for user 110 to select one or more operations associated with virtual object 150, such as user 110 may keep up with a head-up posture for interacting with the CMR environment.

By way of example, user 110 may walk to section A or B on replica menu 140 to select a specific operation associated with section A or B. User 110 may select both operations associated with section A and B by walking to these two sections sequentially or standing on both sections with both feet simultaneously. User 100 may also choose to exit the present mode of menu selection, e.g., by making another preconfigured kinetic gesture, such as jumping or squatting, to exit from radial menu 130 and/or replica menu 140.

If a menu item is selected, HMD 120 may cause the selected menu item to be rendered differently. The selected menu item may be highlighted or changed to a different presentation, so that user 110 may receive the visual feedback or confirmation of the menu selection. In other embodiments, feedback could also include audible feedback, haptic feedback, or feedback in other forms.

If a menu item is selected, HMD 120 may mediate the CMR environment into a different mode corresponding to the selected menu item. Sometimes, the default behavior associated with the selected menu item is activated. Sometimes, additional input may be required to active the operation associated with the selected menu item. The default behavior or required additional input may depend on the context and the characteristics of the target object. Each menu item may be viewed as an actionable item in the CMR environment. Each menu item may represent one or more operations applicable in the CMR environment.

By way of example, menu item A may represent a mode of zooming, while menu item B may represent a mode of panning. Accordingly, if the mode of zooming is activated, a default zooming operation may be automatically applied to virtual object 150. Alternatively, user 110 may use further control mechanisms, such as hand gestures, to provide a control factor for the operation of zooming with virtual object 150.

In some embodiments, radial menu 130 and/or replica menu 140 are optional if user 110 does not need any visual guide, such as for routine operations. As an example, user 110 may configure HMD 120 to zoom in a target object by walking toward the target object, conversely, to zoom out the target object by walking away from the target object.

Figure 2:
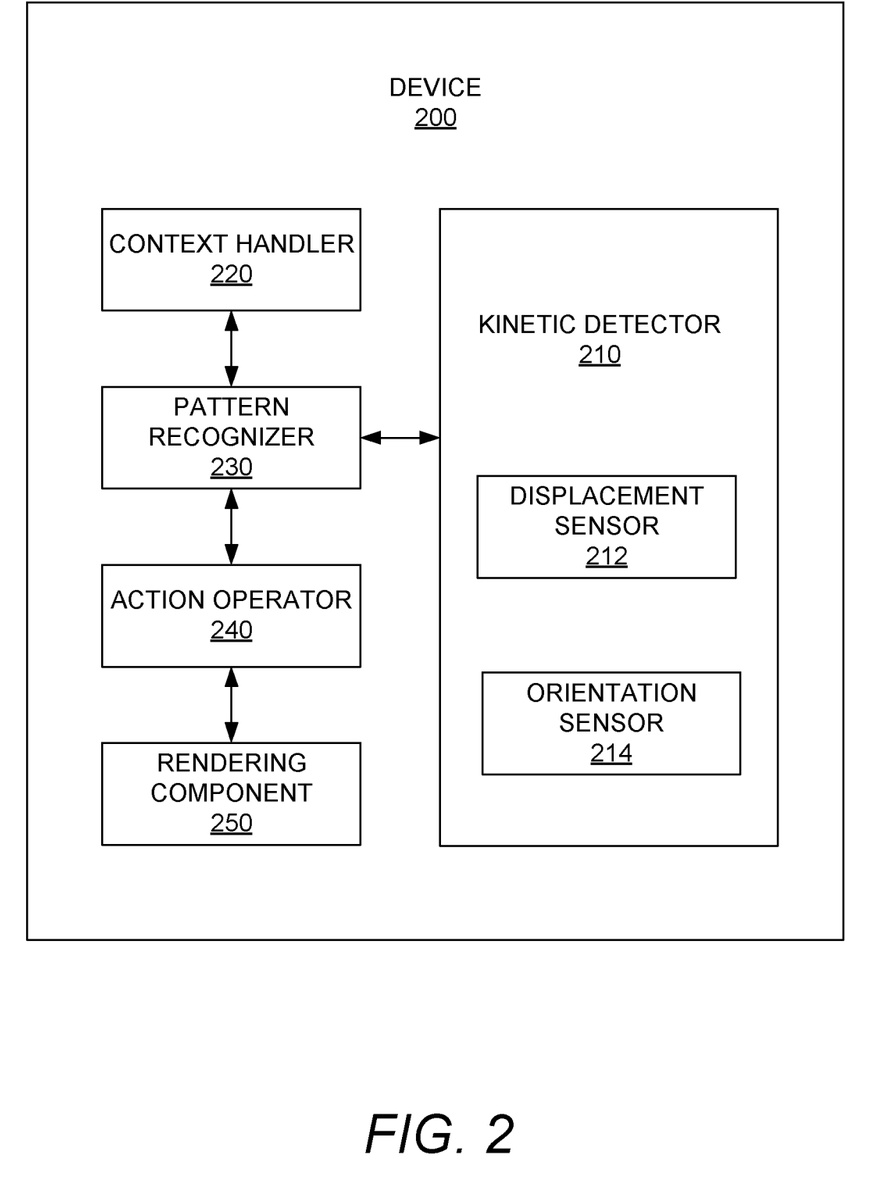
FIG. 2 is a block diagram of an exemplary computing system configured for DOI in CMR, in accordance with some embodiments of the present disclosure.

With reference to FIG. 2, an exemplary device 200 configured for DOI in CMR is provided, in accordance with some embodiments of the present disclosure. In some embodiments, device 200 is embodied as a HMD device, like HMD 120 illustrated in FIG. 1. In some embodiments, device 200 may include any type of computing device, such as computing device 800 described below with reference to FIG. 8. As will be described in more detail below, in various embodiments, device 200 can include, among other things, kinetic detector 210, context handler 220, pattern recognizer 230, action operator 240, and rendering component 250.

In further embodiments, kinetic detector 210 can include, among other things, displacement sensor 212 and orientation sensor 214. In accordance with embodiments described herein, it is contemplated that the aforementioned different components in device 200 can be implemented in any one or more components or subcomponents of device 200. For instance, any one of kinetic detector 210, context handler 220, pattern recognizer 230, action operator 240, and rendering component 250 may be implemented at least in part within a processor, graphical processing unit (GPU), application code, firmware, and the like.

Device 200 can enable interaction with a holographic world by detecting the displacement of device 200 itself, another wearable device, or the user of device 200. The pattern and measurement of the displacement may be translated into one or more operations in CMR. When device 200 is embodied as a HMD device, a user can interact on data or hologram visualization with their head movement while staying in context. Further, a radial menu may be displayed on the floor or in front of the user, and the user can interact with the CMR by walking while keeping up a head-up posture. The menu may be displayed in other shapes, forms, or configurations. Options of the menu items may be selected based on the context, such as the object gazed by the user. In one embodiment, device 200 determines the selected object for the operation just before the user moves to a menu selection mode.

In one embodiment, head movement is mapped to interactions in the CMR environment as follows. First the HMD is registered with a reference location. Second, the orientation and the displacement of the HMD are converted into an amount of modification to an object in the CMR environment. This displacement can be an absolute displacement as computed from the difference between the reference point and the current position of the HMD. This displacement can also be computed as relative displacement, such as a variation in time. As an example, the relative displacement will increase by one unit per second.

In various embodiments, the HMD defines a longitudinal axis that is diagonal to the plane of the body of the device. In general, this longitudinal axis is in parallel with the longitudinal axis of the head of the user when the user keeps the head-up posture. The HMD then detects displacement transversal to the longitudinal axis when the HMD moves from one position to another position. In one embodiment, the menu is displayed based on the user's orientation.

Device 200 is configured to capture and measure the displacement of itself or its user, e.g., based on displacement sensor 212 and orientation sensor 214. Displacement sensor 212 may detect an absolution location, e.g., GPS based location, or a relative location, e.g., an indoor location based on one or more reference points. Displacement sensor 212 may include a GPS sensor, a WiFi receiver, an infrared sensor, etc. to detect absolute location or relative location. Displacement sensor 212 may use other external sensor within the environment such as Kinect® sensors fixed in the room or the like.

Device 200 may use the direction and distance between two locations to detect the displacement of device 200. Displacement sensor 212 may further include an accelerometer or a pressure sensor to detect jumping or squatting motion, and/or stepping, which appears as a displacement parallel to the longitudinal axis. In response to the displacement parallel to the longitudinal axis, device 200 may cause a menu to be displayed or removed from the CMR environment.

In various embodiments, threshold values for displacement may be configured by a user or system to avoid triggering unwanted interactions. The threshold values for displacement may also be dynamically learned as the user is using the device, and/or through a calibration procedure. In this way, only significant displacement of device 200 is recognized as intentional user interaction by kinetic detector 210.

Orientation sensor 214 may detect the orientation of device 200. In various embodiments, orientation sensor 214 may include a gyroscope sensor or a magnetometer to determine the orientation of device 200. By way of example, based on the central gravitational pull, orientation sensor 214 may detect whether device 200 is up or down. Orientation sensor 214 may include a variety of technologies, such as optical or magnetic means to measure rotation. In some embodiments, the initial orientation of device 200 is registered as the starting point. Orientation sensor 214 can then tell how device 200 may have rotated from the starting point. A change of the orientation of device 200 may indicate its movement. Further, the orientation of device 200 may further indicate the focus of the user. For example, if there are two menus in the CMR environment, the orientation of device 200 may help to discern which menu is focused by the user.

In some embodiments, orientation sensor 214 determines an angular direction of the displacement in reference to the first position being an origin of a two-dimensional Euclidean plane transversal to the longitudinal axis. In reference to FIG. 1, the original position may be defined based on the original standing position of user 110 on the floor. Further, an X-axis may be defined based on the axis connecting the two eye displays of HMD 120. Similarly, the Y-axis may be defined based on the axis orthogonal to the X-axis on the same plane. Accordingly, the Z-axis may be defined as the axis orthogonal to both the X-axis and the Y-axis in the 3D space. In this way, the angular direction of the displacement of HMD 120 can be measured in reference to the X-axis or the Y-axis.

Kinetic detector 210 may include various other sensor component(s), e.g., a gyroscope, an accelerometer, and a magnetometer, infrared lights, infrared cameras, motion sensors, light sensors, 3-D scanners, CMOS sensors, a GPS radio, etc. In various embodiments, kinetic detector 210 can employ the aforementioned sensors, among other things, to identify an intended target (e.g., a hand or a foot) of the user of device 200, and track physical locations and movements of device 200 or another device in communication with device 200.

Accordingly, from the received signals, kinetic detector 210 may determine various characteristics associated with the movement of device 200 or various body parts (e.g., the head, a hand, or a foot) of the user of device 200. The characteristics may include the velocity, the acceleration, the direction, the distance, the path, the duration, the frequency, etc. of the displacement of device 200. In various embodiments, such characteristics may form a pattern recognized by pattern recognizer 230.

In some embodiments, kinetic detector 210 can recognize a gesture performed by the user. For instance, the user can perform gestures using his extremities (e.g., arms, fingers, legs, head, etc.), which can be detected, by way of example, via an optical input component such as a camera, motion sensor, infrared sensor, and the like. In various embodiments, such gestures can be converted into control parameters of an action directed by action operator 240.

Device 200 may include a depth camera and/or other sensors (not shown) that support understanding elements of a scene or environment, for example, generating a 3D mesh representation of a surrounding real-world environment.

Further, kinetic detector 210 can use the depth camera and/or other sensors to detect interactions, e.g., between a foot and a radial menu on the floor.

Context handler 220 gathers and analyzes contextual information related to the CMR environment in general or the specific object(s) in the CMR environment. Based in part on the analyzed contextual information, pattern recognizer 230 can more accurately identify the displacement pattern, and action operator 240 can more accurately identify the action to be executed.

Context handler 220 can analyze various contextual information, including stored data, processed data, and/or obtained input data. Input data can include sensor data, controller data, input device data, or any other obtained electronic data that related to one or more virtual objects rendered in the CMR environment. For example, electronic data indicating a user selection from one or more rendered objects can be processed to identify the intended interaction target.

By way of example, one type of contextual information includes the characteristics of the CMR environment, such as the type of interactions and actions available in the CMR environment. Another type of contextual information includes the characteristics of the intended object for interaction, such as the options of interactions and actions available to the object. Another type of contextual information includes the relationship between the present location of device 200 and the intended object for interaction, or the user's relative proximity to the intended target. In this way, a comparison of the relative distance can be made against a threshold distance.

In various embodiments, contextual information can be derived from data or electronic information associated with the intended target, the immersive environment, other rendered objects, real world objects, sensor data, a user profile, an application state, or any combination thereof, to enable pattern recognizer 230 to determine the displacement pattern, and to enable action operator 240 to determine the action to execute. The foregoing examples are merely exemplary and are not intended to be limiting in any way.

Pattern recognizer 230 can use the contextual information to disambiguate the user intention and more accurately interpret the displacement pattern. Advantageously, when there are many options to interpret the user intent associated with a kinetic gesture, pattern recognizer 230 may utilize the contextual information to limit its consideration to only relevant displacement patterns.

In various embodiments, pattern recognizer 230 can determine pertinent displacement patterns of the HMD based on contextual information related to the target object or the view in the CMR environment. As an example, the contextual information provided by context handler 220 may reveal that the user is browsing a list of merchants in the entrance of a virtual mall by gazing at the virtual directory. In this case, pattern recognizer 230 may limit the scope of relevant displacement patterns related to the virtual directory, rather than other options related to the parking lot of the virtual mall.

Pattern recognizer 230 may utilize the contextual information to interpret or disambiguate the kinetic gesture. As an example, the user may start to walk forward, and kinetic detector 210 can detect this horizontal displacement of device 200. However, if the context handler 220 identifies a scene change in the CMR environment which normally requires the user to walk to another position, then pattern recognizer 230 may interpret the displacement as an incidental event, rather than an intentional kinetic gesture.

In various embodiments, pattern recognizer 230 may identify the displacement pattern based on the data from kinetic detector 210 and context handler 220. By way of example, kinetic detector 210 detects a vertical displacement, and context handler 220 identifies an object gazed by the user of device 200 and the contextual information of available actions associated with the object. In this case, pattern recognizer 230 may interpret the vertical displacement as the user intent to activate or disable the menu associated with the object via a kinetic gesture (e.g., jumping or squatting).

As another example, kinetic detector 210 detects a horizontal displacement in a particular direction, and context handler 220 identifies a radial menu displayed in the CMR environment. In this case, pattern recognizer 230 may interpret the horizontal displacement as the user intent to select a particular menu item on the radial menu.

As yet another example, kinetic detector 210 detects a hand gesture of the user, and context handler 220 identifies a particular radial menu already being selected. In this case, pattern recognizer 230 may interpret the hand gesture as the user input of control parameters for the action associated with the selected menu item, and pass the control parameters to action operator 240.

Action operator 240 can process information from pattern recognizer 230, and can further determine how the CMR environment should be modified. Action operator 240 may determine a form of the modification based on the displacement pattern identified by pattern recognizer 230. It may also be said that action operator 240 can determine the mode for the virtual object to be modified or the reaction of the virtual object in response of the displacement of device 200. Further, action operator 240 may also determine the control parameters for the modification.

Continuing with the examples previously discussed in connection with pattern recognizer 230, when pattern recognizer 230 interprets the horizontal displacement as the user intent to select a particular menu item on the radial menu, e.g., zooming in, action operator 240 may further determine the zooming factor based on the measurement of the displacement, such as making the zooming factor proportional to the distance of the displacement. By the same token, if the selected menu item corresponds to a rotation action, action operator 240 may further determine the angle of rotation based on the measurement of the displacement, such as making the angle of rotation proportional to the distance of the displacement.

In some embodiments, action operator 240 is further configured to retrieve the menu, e.g., based on the contextual information provided by context handler 220. As an example, if the user is gazed on an object, then the menu related to the object may be retrieved by action operator 240.

In some embodiments, action operator 240 is further configured to cause the menu being removed from a present view of the CMR environment in response to the displacement being outside of all displacement ranges associated with the menu. For example, the menu may be activated and display to the user related to the object gazed by the user. However, the user may choose to keep on walking instead of making a recognizable kinetic gesture. In this case, the distance of the displacement is going to go beyond all displacement ranges associated with any menu item. Accordingly, action operator 240 may work in synergy with pattern recognizer 230 to remove the menu from being displayed when the user appears uninterested in the menu.

Rendering component 250 may render virtual objects or images based at least in part on the 3D mesh representation.

In this regard, device 200 can specifically include functionality (e.g., augmented reality or mixed reality experiences realized through rendering component 250) to modify the CMR environment (e.g., to create or modify a virtual object) based on the action identified by action operator 240.

In various embodiments, rendering component 250 may cause options of interaction to be presented in the CMR environment, such as a radial menu displayed in front of the user or on the floor, so that the user may be presented with a visual guide listing the available interaction options associated with the target object.

If the menu is to be displayed as a radial menu, then each menu item is given a direction. When the rendering component 250 causes the menu to present in a radial fashion in the CMR environment, the menu items would be arranged in the radial fashion according to respective directions associated with the menu items.

Further, rendering component 250 can modify how virtualized objects are rendered and ultimately perceived by the user, e.g., based at least in part on the action identified by action operator 240. In other words, rendering component 250 may modify the virtual object, e.g., by modifying the configuration (e.g., the position, size, shape, angle) of the virtual object, transforming (e.g., scale, rotate, skew, stretch, warp) the virtual object, or deleting the virtual object, or even creating new ones, in accordance with the action identified by action operator 240.

In various embodiments, each virtual object rendered by rendering component 250 is positioned at a corresponding location relative to device 200, and thereby also to the user wearing device 200. Moreover, the rendered virtual object can be continuously modified in real time, by rendering component 250, to maintain the proper perspective and configuration of the rendered virtual object.

In various embodiments, action operator 240 or rendering component 250 generates an indication for feedback. The indication for feedback may be rendered by rendering component 250 as a visual indicator, such as a color change of the selected menu or a visual presentation or preview of the action. The indication for feedback may be presented by action operator 240, such as haptic feedback, thermal feedback, or audible feedback associated with the action. The feedback may be provided via device 200 or another device connected to device 200. In this way, the user may receive confirmation of the interaction with the CMR environment.

Device 200 may be a scene-aware device that understands elements surrounding a real-world environment and generates virtual objects as augmented reality images. Device 200 may include any type of augmented reality device. An augmented reality device can be an HMD device, and other types of augmented reality devices (e.g., projectors) are contemplated in accordance with embodiments of the present disclosure. One non-limiting example of device 200 is the HoloLens®, developed by Microsoft Corporation of Redmond, Wash.

Further, a component of device 200 as used herein refers to any device, process, service, or any combination thereof. A component of device 200 may be implemented using hardware, software, firmware, a special-purpose device, or any combination thereof. Different components of device 200 may be integrated into a single device or it may be distributed over multiple devices. The various aspects of a component may be collocated or distributed. The component may be formed from other components and aspects thereof.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 3:
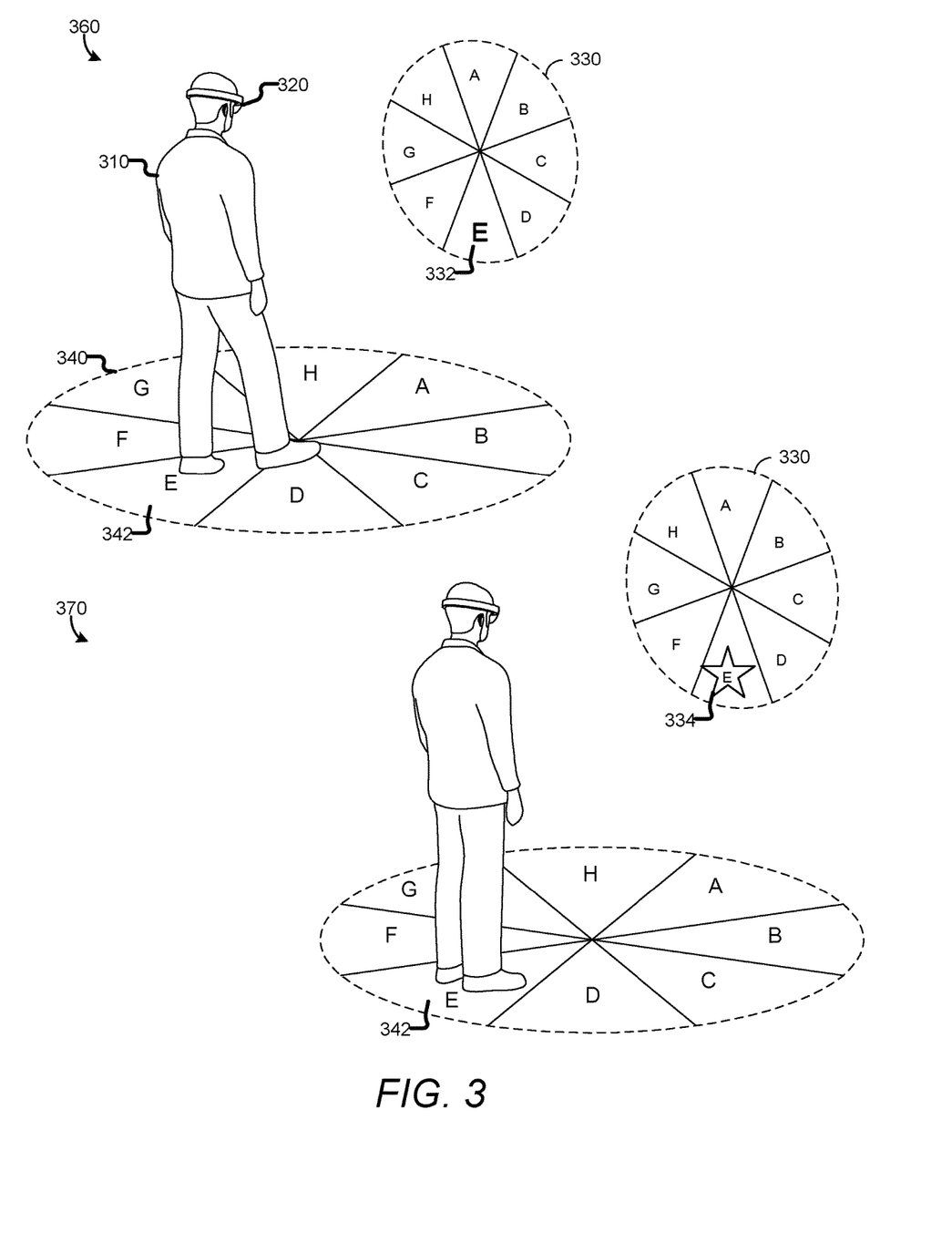
FIG. 3 is a schematic showing a part of an exemplary implementation of DOI in CMR, in accordance with some embodiments of the present disclosure.
Figure 4:
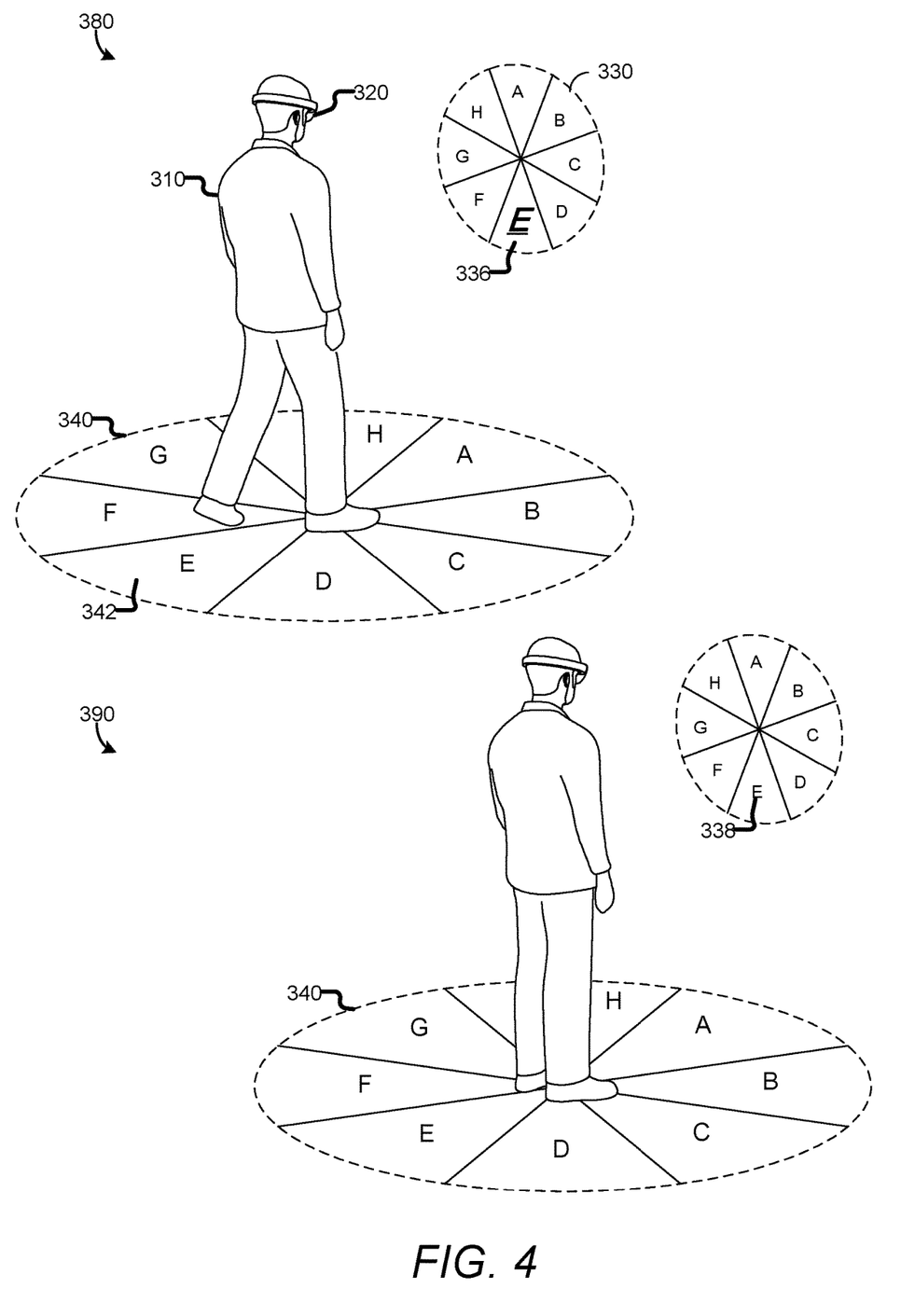
FIG. 4 is a schematic showing another part of the exemplary implementation of DOI in CMR, in accordance with some embodiments of the present disclosure.

FIG. 3 is a schematic showing a part of an exemplary implementation of DOI, and FIG. 4 is a schematic showing another part of the exemplary implementation of DOI, in accordance with some embodiments of the present disclosure. Menu 330 is a radial menu rendered by HMD 320 in front of user 310. Menu 330 has 8 different sections with respective directions. Menu 340 mimics menu 330 and is displayed on the floor with the same menu items in 8 directions, i.e., forward, backward, side left, side right, and 4 diagonal directions.

From blocks 360 and 370 in FIG. 3, HMD 320 confirms user 310's selection of a particular menu item. At block 360, user 310 steps back with one foot to section E. HMD 320 detects its own displacement pattern corresponding to the kinetic gesture made by user 310 or directly detects the foot movement of user 310, e.g., based on optical sensors or a connected wearable device on user 310's foot. In some embodiments, sensing of the foot movement could be done based on sensor data from HMD 320, cameras mounted on HMD 320, external depth cameras, etc. In response to the detected displacement pattern, HMD 320 provides visual feedback to user 310, e.g., by causing visual effect 332 to section E on menu 330 to confirm that user 310 is attempting to select section E.

At block 370, user 310 moves another foot to section E, effectively changing the location of HMD 320 from the original reference point to another location within section 342 of menu 340. HMD 320 detects this displacement pattern. In response to the detected displacement pattern, HMD 320 provides visual feedback to user 310, e.g., by causing another visual effect 334 to section E on menu 330, such as putting a star around the content on section E, to confirm that section E has been selected.

At blocks 380 and 390, user 310 moves back to the original starting position. In this case, HMD 320 detects this displacement pattern as moving from the first position (i.e., the original position) to the second position (i.e., the position on section E), followed by another movement from the second position back to the first position. HMD 320 may interpret this displacement pattern as a gesture to activate the operation associated with the selected menu item. As an example, if section E represents the operation of rotation, after user 310 returns back to the original position, the object gazed by user 310 may start to rotate.

In this sequence of foot movement, HMD 320 detects the pattern of foot movement having two consecutive moves with a first move from a first position to a second position, and a second move from the second position to the first position. Accordingly, HMD 320 selects a menu item of a menu based on the direction formed from the first position to the second position, which is the direction pointing to section 342 in this case.

In an alternative embodiment, from the sequence of blocks 360, 380, and 390 in FIG. 3 and FIG. 4, HMD 320 may confirm user's intent to withdraw a potential selection of menu 330. As an example, at block 380, instead of moving his right foot to section E as at 370, user 310 moves his body weight to his right foot, and starts to move back his left foot from section E to the original reference point. HMD 320 detects this displacement pattern and causes another visual effect 336 to section E on menu 330, such as underlining the content on section E, to acknowledge the user's intent to withdraw the selection of section E.

At block 390, user 310 returns to the original reference point. HMD 320 detects this displacement pattern and causes another visual effect 338 to section E on menu 330, such as removing any special visual effect to section E, to confirm the user's intent to withdraw any selection on menu 330.

Accordingly, the displacement patterns associated with blocks 360, 380, and 390 provide a new way to withdraw a potential selection of menu 330 without triggering a mode switch or modification to the targeted objects in the CMR environment. In other embodiments, different displacement patterns may be registered to HMD 320 as options for user 310 to avoid unintended menu selection, such as by doing two steps in opposite directions.

Figure 5:
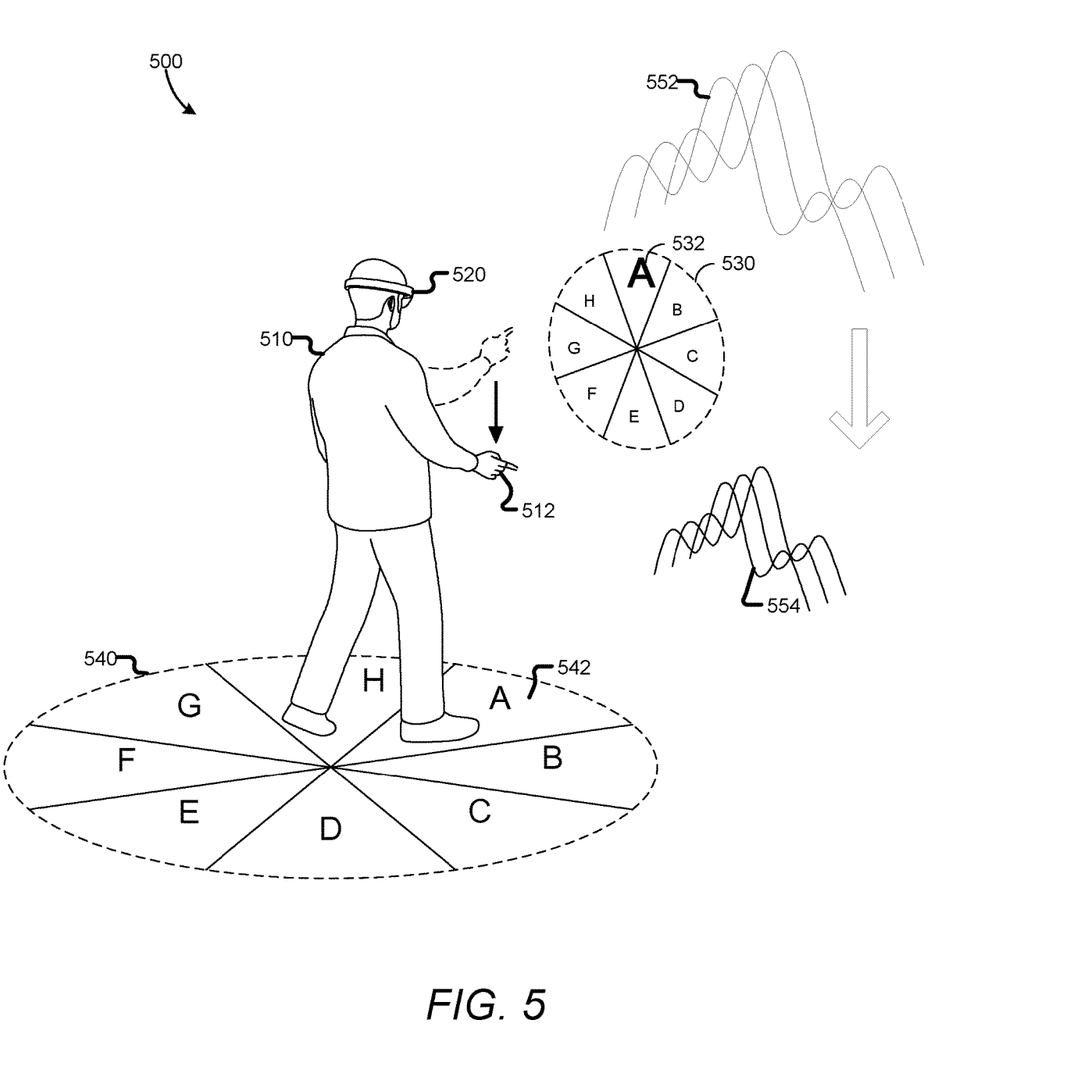
FIG. 5 is a schematic showing another exemplary implementation of DOI in CMR, in accordance with some embodiments of the present disclosure.

FIG. 5 is a schematic showing another exemplary implementation of DOI. In this embodiment, menu 530 is a radial menu rendered by HMD 520 in front of user 510. Menu 530 has 8 different sections with respective directions. Menu 540 mimics menu 530 and is displayed on the floor with the same menu items also in 8 directions, i.e., forward, backward, side left, side right, and four diagonal directions.

HMD 520 utilizes hand gesture 512 in addition to the displacement pattern of HMD 520 to cause object 552 to be changed to object 554. User 510 may use hand gestures to operate on the selected menu item from menu 530, e.g., zooming on data if a zoom mode is selected. In this case, user 510 steps forward to section 542 of menu 540. HMD 520 detects this displacement pattern caused by this foot movement. Further, HMD 520 also detects hand gesture 512, which is a vertical downward swiping motion, based on optical sensors or a connected wearable device on user 510's wrist.

In response to the detected displacement pattern, HMD 520 provides visual feedback to user 510, e.g., by causing visual effect 532 to section A on menu 530, indicating that user 510 is attempting to select section A, which is the menu item for zooming. In further response to the detected hand gesture 512, HMD 520 may execute an action, which is to shrink object 552, and render it as object 554. The characteristics of hand gesture 512 may be used by HMD 520 to control the transformation from object 552 to object 554, such as using the distance or speed of the vertical downward swiping motion as control parameters for shrinking object 552.

In alternative embodiments, instead of making hand gesture 512, user 510 may use the characteristics of his foot movement to control the modification to object 552. By way of example, user 510 may use the step length to control the shrinking factor for object 552, in which different step lengths may correspond to different shrinking factors.

Figure 6:
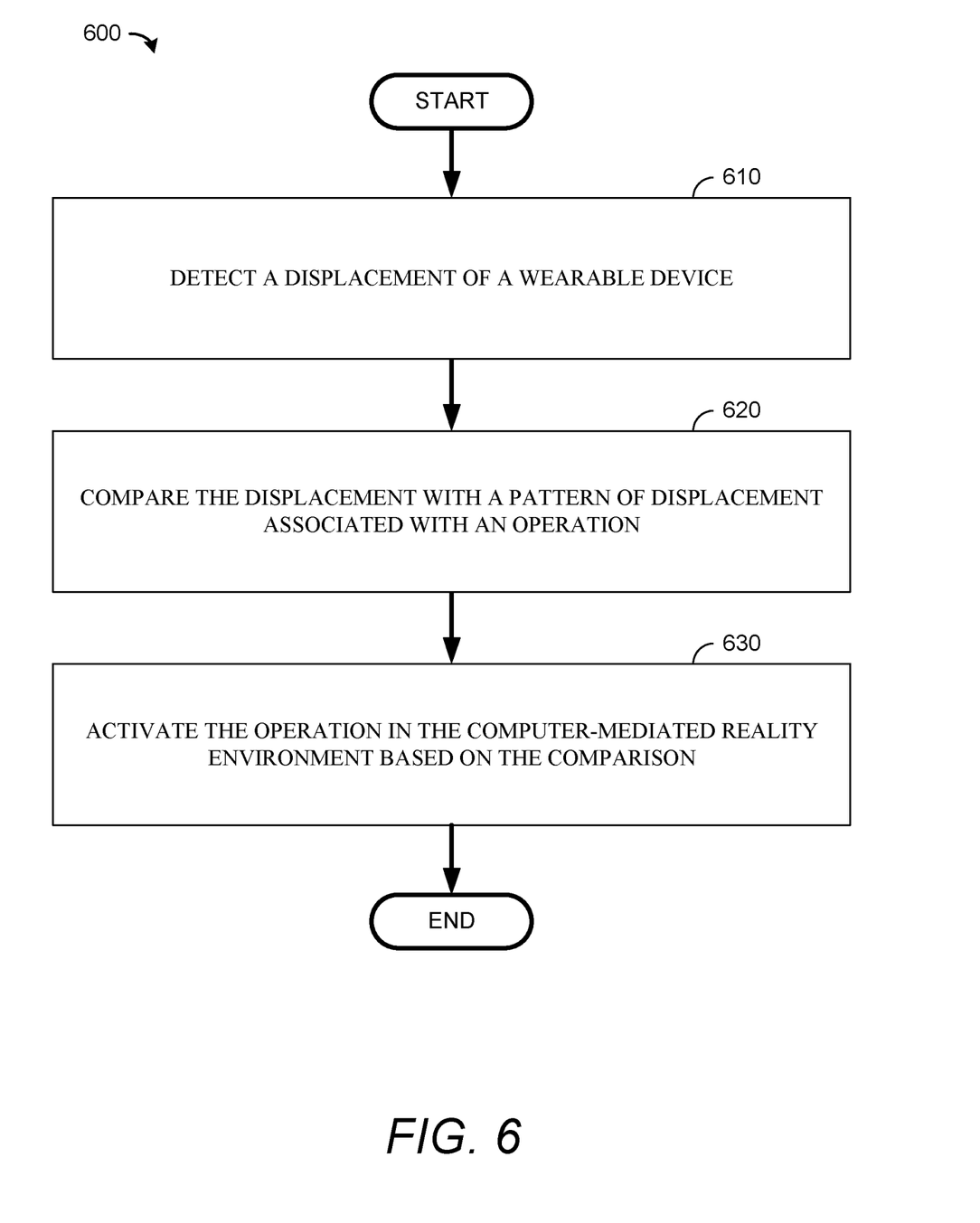
FIG. 6 is a flow diagram showing a process for DOI in CMR, in accordance with some embodiments of the present disclosure.

Referring now to FIG. 6 in light of FIGS. 1-5, FIG. 6 is a flow diagram showing a method 600 for DOI in a CMR environment. Each block of method 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 610, a displacement of a wearable device may be detected, by kinetic detector 210 of FIG. 2. If the distance of the displacement is below a predetermined threshold, the duration of the displacement is below a predetermined threshold, or another characteristic of the displacement is not meeting a requisite, the detected displacement may not warrant further processing.

In some embodiments, a hysteresis process is used to detect displacement or suspend an ongoing DOI. For example, the user may be required to move the wearable device (e.g., a HMD) in any direction but with sufficient speed (e.g., 20 cm per second) to trigger a detection of displacement. Alternatively, the user may be required to move the wearable device past a certain threshold distance from the idle position (e.g., 20 cm). The threshold distance may be set differently for each foot. The threshold distance may be set differently for different foot movement, such as moving toward a menu item or moving back to the center.

As another example, an ongoing DOI may be suspended when the user stops to move for a period (e.g., 1 second). As yet another example, a control device may be used to activate or stop DOI, such as using a button on a control device to activate or stop DOI.

At block 620, the displacement may be compared with a pattern of displacement associated with an operation, e.g., by pattern recognizer 230 of FIG. 2. The specific operation may be defined by a menu item, such as an operation to modify the target object via panning, zooming, rotating, etc. The pattern of displacement may be also defined by the menu item, for example, the placement of the specific menu item on the menu, i.e., in a specific section with a particular direction.

In some embodiments, a menu item represents an operation related to an object or a view in a CMR environment. Further, the menu item is associated with a displacement range, which may be a range of angles in a plane transversal to the longitudinal axis defined by the HMD. In some embodiments, this plane transversal to the longitudinal axis is in parallel with the floor.

Using menu 140 in FIG. 1 as an example, section C may be associated with the range of 0 to 45 degrees; section B may be associated with the range of 46 to 90 degrees; section A may be associated with the range of 91 to 135 degrees; section H may be associated with the range of 136 to 180 degrees; and so forth.

Further, all sections may be associated with a minimum distance and a maximum distance. In one embodiment, the minimum distance and the maximum distance may be dynamically change based on speed or acceleration of the detected displacement. In various embodiments, pattern recognizer 230 of FIG. 2 may be further configured to determine whether the distance value of the displacement is greater than a minimum distance and lesser than a maximum distance associated with the displacement range. In some embodiments, a displacement outside of the distance range will be overlooked by the system. In this way, detections of false positive displacement may be mitigated. By way of example, if the user keeps on walking, the distance of the displacement would exceed the maximum distance threshold, and this action of walking would not be interpreted as a kinetic gesture for the purpose of this disclosure.

Pattern recognizer 230 may compare various characteristics of the detected displacement with the known pattern of displacement associated with the operation, such as the direction or the angle of the displacement, the duration of the displacement, the speed of the displacement, etc. By way of example, one characteristic to be compared is the direction. If the direction falls into the range of 0 and 45 degrees, then section C of menu 140 may be selected.

Different matching criteria may be used, such as identical match or substantial match. In an identical matching test, all characteristics to compare with must match. In a substantial matching test, a predefined threshold, e.g., 70% of the compared characteristics, may be used to determine whether the substantial match test is passed. By way of example, if there are three characteristics to compare with, and the threshold is ⅔; then a menu item would be selected only if two or three characteristics are matched between the detected displacement pattern and the known pattern of displacement associated with the menu item.

At block 630, the operation can be activated in the CMR environment based on the comparison, e.g., by action operator 240 of FIG. 2. In general, if the detected displacement pattern matches a pattern of displacement associated with an operation, then the operation may be activated. Further, action operator 240 may use the characteristics of the displacement to control the action. By way of example, action operator 240 may use the distance of displacement to control the magnitude of the action, e.g., the zooming factor.

In various embodiments, the pattern recognizer is configured to determine whether the angular direction of the displacement is bound by the minimum angle and the maximum angle of the displacement range. As described in connection with block 620, a displacement range associated with a menu item may define one or more extrema, such as 0 as the minimum and 45 as the maximum for the range associated with section C of menu 140. By way of example, if the detected displacement pattern shows an angle of 23 degrees, then it is bounded by the two extrema of the displacement range associated with section C of menu 140. Therefore, the section C of menu 140 may be selected, or the operation associated with the section C may be activated.

In some embodiments, a hysteresis process is used to activate the operation. By way of example, in response to the menu item being selected, the HMD may modify a visual presentation of the menu item on the menu, and start a timer with a predetermined time period. After the timer runs down, the HMD may active the operation associated with the menu item.

In connection with FIG. 3, at block 370, a timer may be started. If the predetermined time period is over, then the operation associated with section E may be activated. However, if the user makes another movement before the timer runs out, such as walking forward two steps into section A, the menu item of section A may be selected instead. Subsequently, another timer may be started for this new selection. Advantageously, the user may easily change his menu selection in these embodiments.

Figure 7:
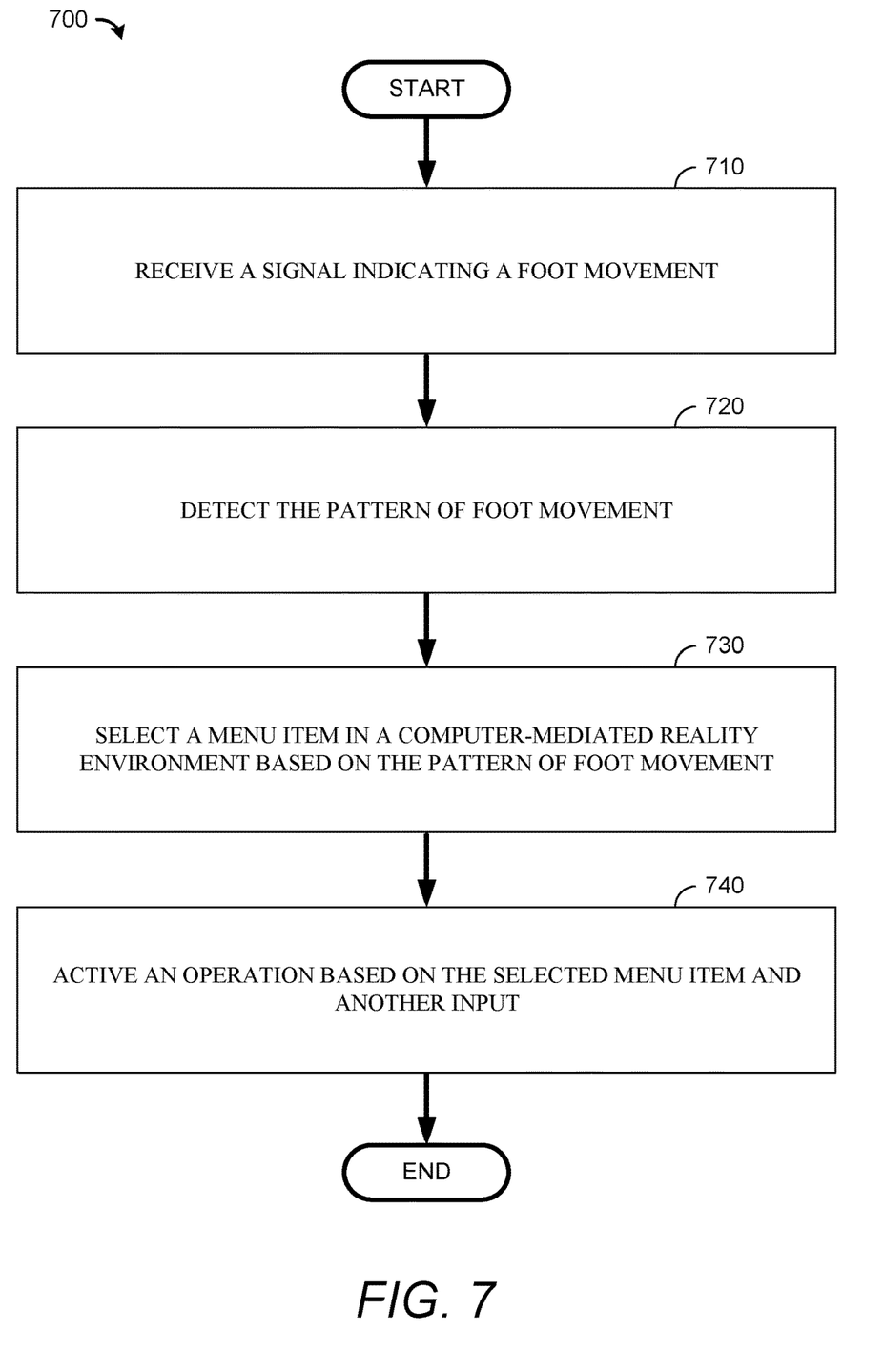
FIG. 7 is a flow diagram showing another process for DOI in CMR, in accordance with some embodiments of the present disclosure.

Referring now to FIG. 7 in light of FIGS. 1-6, FIG. 7 is a flow diagram showing a method 700 for DOI in CMR. Each block of method 700, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At block 710, a signal indicating a foot movement may be received, e.g., by the kinetic detector in HMD 520. By way of example, in connection with FIG. 5, user 510 moves his right foot forward into section 542, and a signal, e.g., generated from the displacement sensor, indicating this foot movement is received by the kinetic detector in HMD 520.

At block 720, the pattern of foot movement may be detected, e.g., by the pattern recognizer in HMD 520. Continuing with the aforementioned example, the pattern recognizer in HMD 520 may recognize the present pattern of foot movement as a lateral displacement with a forward direction, which matches the displacement pattern associated with the menu item on section 542.

At block 730, a menu item in a CMR environment may be selected based on the pattern of foot movement, e.g., by the action operator in HMD 520. Continuing with the aforementioned example, the action operator in HMD 520 may then select the menu item on section A and provide a visual feedback by changing the appearance of section A.

At block 740, an operation may be activated based on the selected menu item and another input. In connection with FIG. 5, the additional input is a hand gesture. The section A may represent a zooming operation, and the hand gesture may further provide the control factor for zooming, e.g., proportional to the distance or speed of the hand gesture. In another embodiment, the additional input may be generated from a control device, such as a touchpad that enables the additional input. In other embodiments, other type of input may be used to provide the control parameters for the operation.

Figure 8:
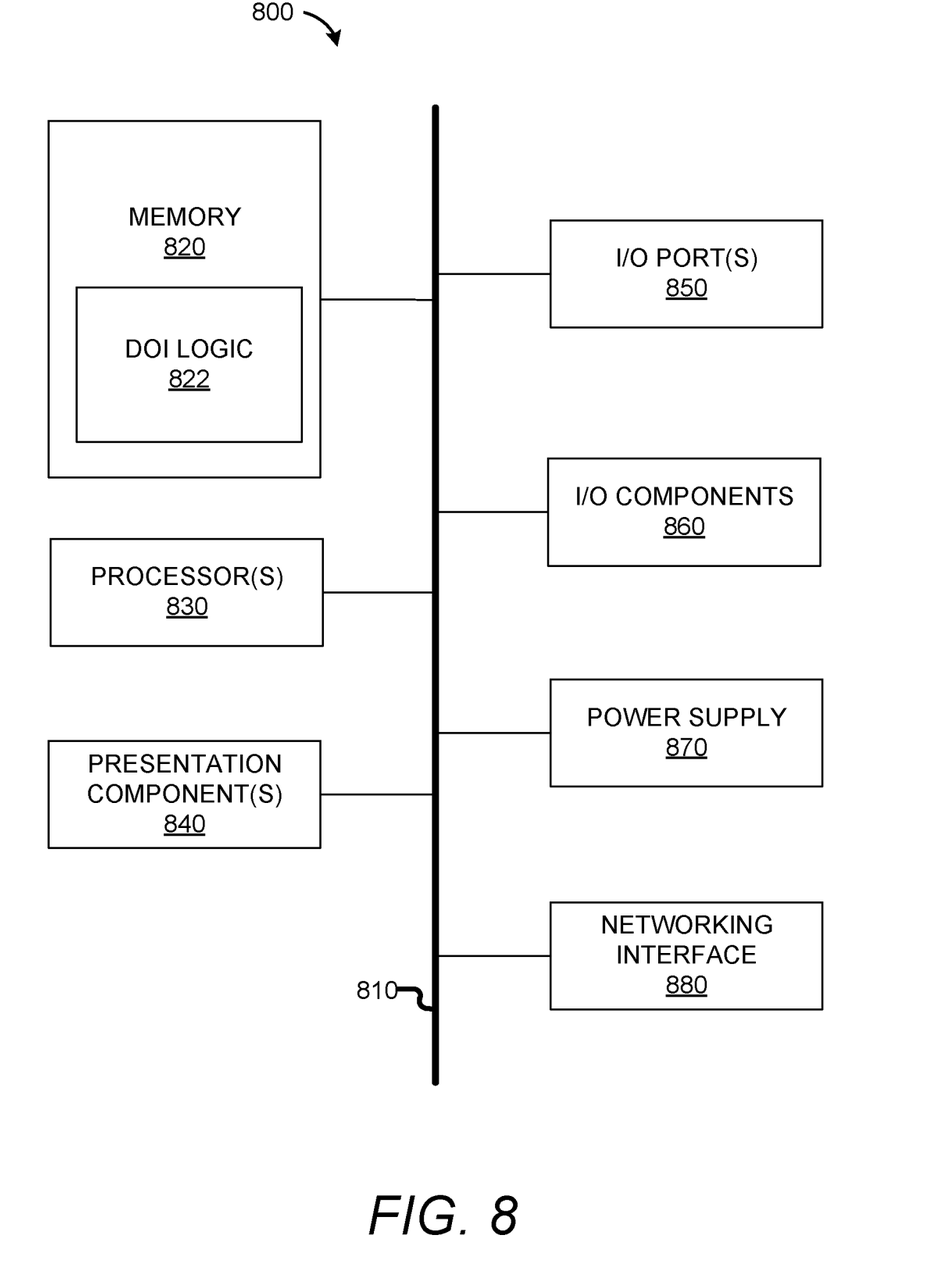
FIG. 8 is a block diagram of an exemplary computing environment suitable for use in implementing embodiments of the present disclosure.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800.

Computing device 800 is but one example of a suitable computing environment and is not intended to suggest any limitation as to the scope of use of the technology described herein. Neither should computing device 800 be interpreted as having any dependency or requirement relating to any one or combination of components illustrated.

The technology described herein may be described in the general context of computer code or machine-usable instructions, including computer-executable instructions such as program components, being executed by a computer or other machine. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are connected through a communications network.

With continued reference to FIG. 8, computing device 800 includes a bus 810 that directly or indirectly couples the following devices: memory 820, one or more processors 830, one or more presentation components 840, input/output (I/O) ports 850, I/O components 860, and an illustrative power supply 870. Bus 810 represents what may be one or more busses (such as an address bus, data bus, or a combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer storage media in the form of volatile and/or nonvolatile memory. The memory 820 may be removable, non-removable, or a combination thereof. Exemplary memory includes solid-state memory, hard drives, optical-disc drives, etc. Computing device 800 includes one or more processors 830 that read data from various entities such as bus 810, memory 820, or I/O components 860. Presentation components 840 present data indications to a user or other device. Exemplary presentation components 840 include a display device, speaker, printing component, vibrating component, etc. I/O ports 850 allow computing device 800 to be logically coupled to other devices, including I/O components 860, some of which may be built in.

In various embodiments, memory 820 includes, in particular, temporal and persistent copies of displacement oriented interaction (DOI) logic 822. DOI logic 822 includes instructions that, when executed by one or more processors 830, result in computing device 800 performing various functions, such as, but not limited to, method 600 or 700. In various embodiments, DOI logic 822 includes instructions that, when executed by processor(s) 830, result in computing device 800 performing various functions associated with, but not limited to, kinetic detector 210, context handler 220, pattern recognizer 230, action operator 240, or rendering component 250 in connection with FIG. 2.

In some embodiments, one or more processors 830 may be packaged together with DOI logic 822. In some embodiments, one or more processors 830 may be packaged together with DOI logic 822 to form a System in Package (SiP). In some embodiments, one or more processors 830 can be integrated on the same die with DOI logic 822. In some embodiments, processors 830 can be integrated on the same die with DOI logic 822 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 830 may be direct or via a coupling utilizing a serial port, parallel port, Universal Serial Bus (USB) port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

Computing device 800 may include networking interface 880. The networking interface 880 includes a network interface controller (NIC) that transmits and receives data. The networking interface 880 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 880 may include a wireless terminal adapted to receive communications and media over various wireless networks. Computing device 800 may communicate via wireless protocols, such as Code Division Multiple Access (CDMA), Global System for Mobiles (GSM), or Time Division Multiple Access (TDMA), as well as others, to communicate with other devices via the networking interface 880. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using one or more of CDMA, GPRS, GSM, TDMA, and 802.16 protocols.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however, the head-mounted display unit depicted herein is merely exemplary. Components can be configured for performing novel aspects of embodiments, where "configured for" comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A non-transitory computer storage device comprising computer-implemented instructions that, when used by one or more computing devices, cause the one or more computing devices to perform operations comprising:
   receiving a signal indicating a pattern of foot movement of a user, wherein the pattern of foot movement is made relative to a menu presented in a computer-mediated reality environment and horizontally projected around the user;
   detecting the pattern of foot movement having two consecutive moves with a first move from a first position to a second position, and a second move from the second position to the first position; and
   selecting a menu item of the menu based on the pattern of movement and a determination that the second position corresponds to the menu item.

2. The computer storage device of claim 1, the operations further comprising:
   in response to a hand gesture, simultaneously presenting the menu vertically in front of the user in the computer-mediated reality environment as a visual guide for the user to make the pattern of foot movement.

3. The computer storage device of claim 1, the operations further comprising:
   in response to the menu item being selected, causing a visual presentation of the menu item on the menu to be modified.

4. The computer storage device of claim 1, wherein the menu item is being selected at a first time, the operations further comprising:
   causing an operation associated with the menu item to be activated in the computer-mediated reality environment at a second time, wherein the second time has a predetermined delay from the first time.

5. The computer storage device of claim 1, wherein the menu item is a first menu item associated with a first operation, the operations further comprising:
   in response to the first menu item being selected, starting a timer with a predetermined time period; and
   in response to another signal indicating another pattern of foot movement being received before the timer goes off, deselecting the first menu item and selecting a second menu item of the menu based on the another pattern of foot movement.

6. The computer storage device of claim 1, the operations further comprising:
   detecting a hand gesture; and
   interpreting, based on the menu item, the hand gesture to indicate an action.

7. The computer storage device of claim 6, the operations further comprising:
   modifying an object or a view of the computer-mediated reality environment based on the action.

8. The computer storage device of claim 1, the operations further comprising:
   modifying an object or a view of the computer-mediated reality environment based on the menu item and a characteristic of the pattern of foot movement.

9. The computer storage device of claim 8, the characteristic of the pattern of foot movement comprises a step length, the operations further comprising:
   modifying the object or the view based on a shrinking factor corresponding to the step length.

10. A computer-implemented method, comprising:
    receiving a signal indicating a pattern of foot movement of a user, wherein the pattern of foot movement is made relative to a menu presented in a computer-mediated reality environment and horizontally projected around the user;
    detecting the pattern of foot movement having two consecutive moves with a first move from a first position to a second position, and a second move from the second position to the first position; and
    selecting a menu item of the menu based on a direction formed from the first position to the second position.

11. The method of claim 10, further comprising:
    in response to a hand gesture, simultaneously presenting the menu vertically in front of the user in the computer-mediated reality environment as a visual guide for the user to make the pattern of foot movement.

12. The method of claim 10, further comprising:
    in response to the menu item being selected, causing a visual presentation of the menu item on the menu to be modified.

13. The method of claim 10, wherein the menu item is being selected at a first time, the method further comprising:
    causing an operation associated with the menu item to be activated in the computer-mediated reality environment at a second time, wherein the second time has a predetermined delay from the first time.

14. The method of claim 10, wherein the menu item is a first menu item, the method further comprising:
in response to the first menu item being selected, starting a timer with a predetermined time period; and
in response to another signal indicating another pattern of foot movement being received before the timer goes off, deselecting the first menu item and selecting a second menu item of the menu based on the another pattern of foot movement.

15. The method of claim 10, further comprising:
detecting a hand gesture;
interpreting, based on the menu item, the hand gesture to indicate an action; and
modifying an object or a view of the computer-mediated reality environment based on the action.

16. The method of claim 10, further comprising:
modifying an object or a view of the computer-mediated reality environment based on the menu item and a characteristic of the pattern of foot movement.

17. The method of claim 16, wherein the characteristic of the pattern of foot movement comprises a step length, the method further comprising:
modifying the object or the view based on a shrinking factor corresponding to the step length.

18. A computer-implemented system for displacement oriented interaction in computer-mediated reality, the system comprising:
one or more processors; and
one or more computer storage media storing computer-usable instructions that, when used by the one or more processors, cause the one or more processors to:
receive a signal indicating a pattern of foot movement of a user, wherein the pattern of foot movement is made relative to a menu presented in a computer-mediated reality environment and horizontally projected around the user;
detect the pattern of foot movement having two consecutive moves with a first move from a first position to a second position, and a second move from the second position to the first position; and
select a menu item of the menu based on a direction formed from the first position to the second position.

19. The system of claim 18, wherein the instructions further cause the one or more processors to:
simultaneously present the menu vertically in front of the user in the computer-mediated reality environment as a visual guide for the user to make the pattern of foot movement.

20. The system of claim 18, wherein the instructions further cause the one or more processors to:
modify an object or a view in the computer-mediated reality environment based on the menu item and a characteristic of the pattern of foot movement.

\* \* \* \* \*